United States Patent
Jayasheela

(10) Patent No.: US 8,478,558 B2
(45) Date of Patent: Jul. 2, 2013

(54) METHOD FOR PROCESSING A TEMPERATURE SENSOR SIGNAL

(75) Inventor: Vijit Paul Jayasheela, Sheboygan, WI (US)

(73) Assignee: Kohler Co., Kohler, WI (US)

( * ) Notice: Subject to any disclaimer, the term of this patent is extended or adjusted under 35 U.S.C. 154(b) by 460 days.

(21) Appl. No.: 12/338,709

(22) Filed: Dec. 18, 2008

(65) Prior Publication Data

US 2010/0161270 A1    Jun. 24, 2010

(51) Int. Cl.
*G01K 1/00* (2006.01)
*G01K 3/00* (2006.01)

(52) U.S. Cl.
USPC .......................................................... 702/130

(58) Field of Classification Search
USPC .................................................... 702/99, 130
See application file for complete search history.

(56) References Cited

U.S. PATENT DOCUMENTS

| | | | | |
|---|---|---|---|---|
| 3,973,147 A | * | 8/1976 | Yu | 327/512 |
| 4,464,067 A | * | 8/1984 | Hanaoka | 374/170 |
| 4,471,354 A | * | 9/1984 | Smith | 340/870.17 |
| 4,602,871 A | * | 7/1986 | Hanaoka | 374/102 |
| 5,832,721 A | * | 11/1998 | Cullen | 60/274 |
| 5,857,777 A | | 1/1999 | Schuh | |
| 5,948,368 A | | 9/1999 | Hirai et al. | |
| 6,363,332 B1 | * | 3/2002 | Rangarajan et al. | 702/185 |
| 6,827,487 B2 | | 12/2004 | Baumbach | |
| 7,413,343 B2 | | 8/2008 | Taylor | |
| 2002/0114375 A1 | * | 8/2002 | Pompei | 374/133 |
| 2007/0171055 A1 | | 7/2007 | Laakso et al. | |
| 2008/0043809 A1 | | 2/2008 | Herbert | |
| 2008/0099570 A1 | | 5/2008 | Krebs et al. | |

OTHER PUBLICATIONS

MAXIM, Four-Channel Thermistor Temperature-to-Pulse-Width Converter. MAX6691. Maxim Integrated Products, CA. 2007.*
Qingshan Shan, et al., "Wireless Monitoring System for Vehicle Refrigerator", 2005 IEEE International Conference on Information Acquisition Jun. 27-Jul. 3, 2005, Hong Kong and Macau, China, pp. 417-420, IEEE, Piscataway, NJ.
Paul Horowitz, Winfield Hill,: "The Art of Electronics", 1980, pp. 579-580, Cambridge University Press, Cambridge, ISBN: 0521231515.

* cited by examiner

*Primary Examiner* — Aditya Bhat
(74) *Attorney, Agent, or Firm* — Michael Best & Friedrich LLP

(57) ABSTRACT

A method for processing a pulse width modulated signal from a temperature sensor, wherein the signal varies non-linearly and non-exponentially with changes in temperature. An exponential equation is defined that is closely fitted to the relationship between a characteristic of the signal and the temperature. The signal from the sensor is processed by measuring the characteristic to produce a sensor value. That sensor value then is employed to solve the exponential equation which produces a value for the temperature.

13 Claims, 1 Drawing Sheet

METHOD FOR PROCESSING A TEMPERATURE SENSOR SIGNAL

CROSS-REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

1. Field of the Invention

The present invention relates to a temperature sensors; and in particular to processing a temperature sensor output signal that varies non-linearly with temperature.

2. Description of the Related Art

Many internal combustion engines are now controlled by a sophisticated microcomputer based system. The microcomputer responds to different parameters of the engine which are sensed. One of those parameters is engine temperature that is derived from a sensor sensing the temperature of the coolant for the engine. A common temperature sensor produces an output signal that is converted to a pulse width modulated signal indicating the sensed temperature.

A characteristic of the PWM output signal, such as the duration of either the high or low signal level portion, varies to denote the temperature that was sensed. In many sensors of this type, the signal varies in a non-linear manner with temperature. On a graph of the PWM signal values versus temperature, the resultant plot would be a series of linear sections having different slopes connected together.

Not only is the relationship between the PWM signal values and temperature characterized by sections with different slopes, those slopes change for different starting temperatures of the engine. As a result, the control circuit has to employ relatively complex signal processing to accurately convert a value derived from the PWM sensor signal to the corresponding temperature. A common prior technique involved storing, in the engine control computer, sets of data defining the slopes of each linear section of the PWM sensor signal to temperature relationship for different starting temperatures. The accuracy of the signal conversion depended upon the number of different slope segments employed to represent each starting temperature based signal relationship.

When the engine started, the initial temperature was sensed and used to select the set of data for the associated PWM sensor signal to temperature relationship. Each time thereafter that PWM sensor signal was read by the engine computer, the slope for the corresponding section of the selected set of data was determined and used to convert the PWM signal value into a temperature value. That technique required several data access and calculation steps and therefore required a substantial amount of computer processing.

Thus there is a desire to provide a simpler method for processing the PWM signal values to produce the corresponding temperature for use in the engine control circuitry.

SUMMARY OF THE INVENTION

A sensor on an apparatus produces an output the signal with a characteristic that varies non-linearly and non-exponentially with changes in a parameter being sensed. A method for processing that sensor signal defines an exponential equation that specifies a relationship between variation of the signal characteristic and the parameter being sensed. Upon receiving the signal from the sensor, the characteristic of the signal is measured to produce a sensor value. Then the sensor value is used to solve the exponential equation thereby producing a value for the parameter that is sensed by the sensor.

In one application of this method, a temperature sensor on an engine and the related circuitry produce a pulse width modulated signal that has portion, the duration of which varies non-linearly and non-exponentially with engine temperature changes. The duration of that portion of the signal is measured to produce a sensor value. In this particular application, the relationship between variation of the signal characteristic and the parameter being sensed is dependent upon an initial temperature when the engine starts operating and a steady state operating temperature of the engine. The exponential equation contains one term corresponding to the initial temperature and another term corresponding to the steady state operating temperature.

DETAILED DESCRIPTION OF THE INVENTION

Figure 1:
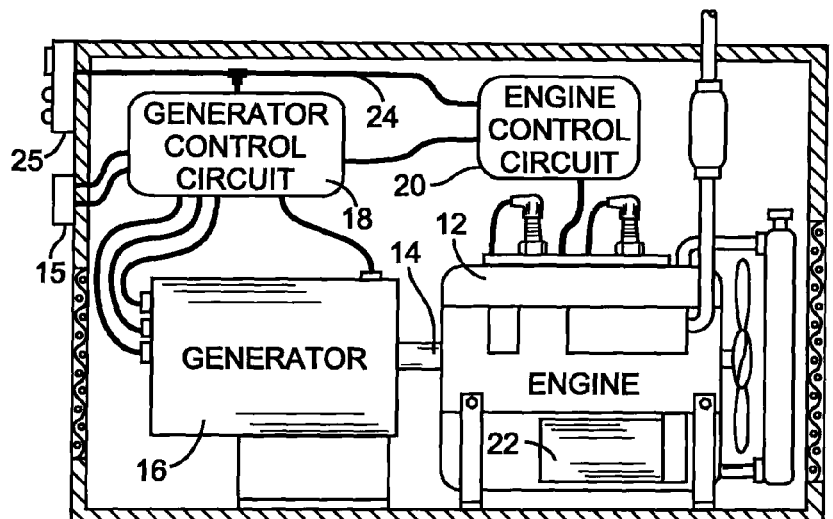
FIG. 1 depicts components of a typical engine-generator set that incorporates the present invention.

With initial reference to FIG. 1, an engine-generator set 10 comprises an engine 12 and coupled directly by a shaft 14 to a generator 16. This engine-generator set 10 is commonly used to provide back-up electrical power to a building in the event that power from a utility company is interrupted. That interruption is automatically sensed by an automatic transfer switch (not shown) which is connected to the utility lines and the output 15 of the generator. When the automatic transfer switch detects that the utility power is unavailable, a signal is sent commanding the engine-generator set 10 to start. Shortly thereafter, the automatic transfer switch disconnects the building's electrical wiring from the utility lines and connects that wiring to the output 15 of the engine-generator set.

The start command from the automatic transfer switch is received by the engine-generator set 10 at an operator control panel 25 that is connected via a communication bus 24 to a generator control circuit 18 and an engine control circuit 20. The communication bus 24 may conform to the Computer Area Network (CAN) J-1939 standard promulgated by SAE International, formerly known as the Society of Automotive Engineers, Inc., however a communication bus using another protocol may be used. The generator control circuit 18 and the engine control circuit 20 respectively control the operation of the generator 16 and the internal combustion engine 12.

Figure 2:
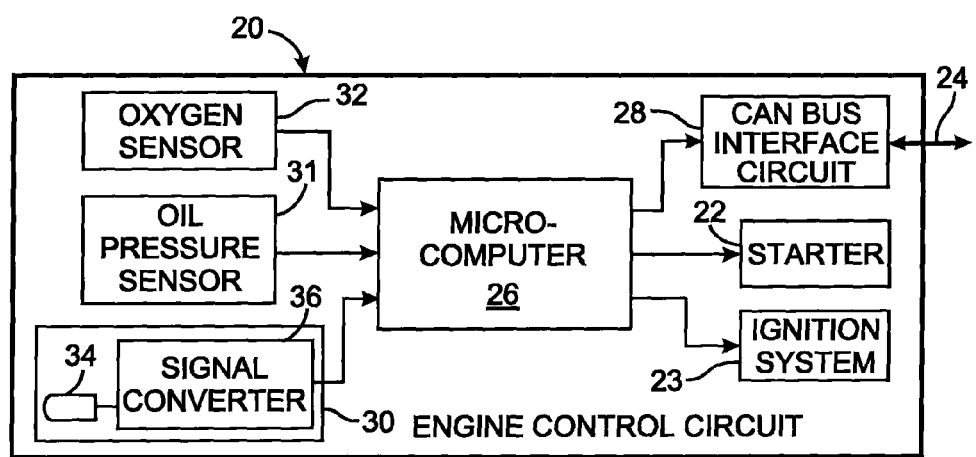
FIG. 2 is a schematic block diagram of the engine control circuit in FIG. 1 that processes an output signal from a temperature sensor on the engine.

With reference to FIG. 2, the engine control circuit 20 is built around a microcomputer 26 which includes a memory that stores a control program and data for operating of the engine. In addition, the microcomputer 26 has internal interface circuits for receiving signals from components on the engine and for producing output signals to control other devices. For example, the microcomputer 26 receives signals from several sensors on the engine 12, such as an engine temperature sensor 30 in the coolant system, an oil pressure sensor 31, and an oxygen sensor 32. Additional sensors and other devices may provide input signals to the microcomputer 26. The microcomputer 26 produces output signals to control the engine starter 22 and the ignition system 23. The command to start the engine-generator set 10 is received from the operator control panel 25 via the CAN communication bus 24 at a CAN bus interface circuit 28 connected to the microcomputer 26. The engine control circuit 20 also exchanges other messages with the operator control panel 25 and the generator control circuit 18 via the CAN communication bus 24.

The present invention relates to the manner in which the microcomputer 26 processes the signal produced by the engine temperature sensor 30. The engine temperature sensor 30 comprises a sensing device 34 and a signal converter 36. The sensing device 34, which may be a Series 5024-0805 device from Airpax Corporation, Frederick, Md., USA., produces an analog signal that is transformed by the signal converter 36 into a pulse width modulated output signal having a characteristic that is varied to indicate the sensed temperature. For example the duty cycle of that signal may vary, or the duration of a high signal level portion of the PWM cycle can remain constant while the duration of a low signal level portion varies in relation to the sensed temperature. The PWM output signal from the signal converter 36 is applied to an input of the microcomputer 26.

When the control program executed by the microcomputer 26 desires to read the temperature from sensor 30, the control program begins sampling the sensor signal at the corresponding microcomputer input and measures the signal characteristic that indicates the sensed temperature. For example, if the duty cycle varies with temperature, the microcomputer measures the duration of the high signal level portion of the PWM sensor output signal. Specifically upon finding a low to high signal level transition, the microcomputer begins a timer that is periodically incremented, every millisecond for example. When the microcomputer then detects a high to low signal level transition, the timer is stopped. The resultant timer value, also referred to herein as the PWM signal value, corresponds in a known manner to the engine temperature that was sensed.

Figure 3:
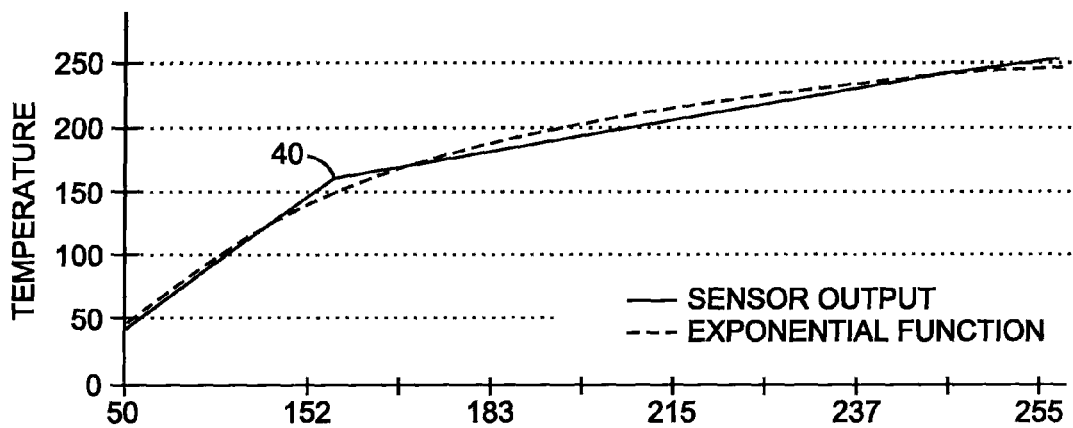
FIG. 3 is a graph of the relationship between the temperature and the output signal from a temperature sensor.

As noted previously, the output signal from the temperature sensor 30 is non-linear and non-exponential, an exemplary output signal is depicted by the solid curve in FIG. 3 which is formed by several segments having different slopes that are joined at knees, such as knee 40. The exact contour of that curve, i.e. the slopes of the different segments, is dependent upon the starting temperature of the engine. Also the engine temperature ultimately increases to a steady state temperature, which is the temperature normally encountered when the cooling system for the engine is functioning properly. Thus the steady state temperature is known from either the engine design specifications or empirical data.

The present method conceptually fits an exponential curve, denoted by the dashed line in FIG. 3, to the plot of the PWM signal values produced by the engine temperature sensor 30. That curve defines the following exponential equation:

$$T = T_\infty + \frac{T_i - T_\infty}{e^{kt}}$$

where T is the present engine temperature, $T_\infty$ is the steady state temperature, $T_i$ is the initial temperature when the engine started, k is an exponential constant, and t is the PWM signal value that indicates the present temperature. The value of the exponential constant k depends upon the sensor signal to temperature relationship for a particular model of sensor and can be determined empirically. For example, four is the value of the exponential constant is used with the Airpax Series 5024-0805 temperature sensor mentioned above. The steady state temperature used in this equation is a fixed value for a particular engine.

The initial temperature is determined by the microcomputer 26 reading the signal from the engine temperature sensor 30 at the time the engine is started. That initial temperature usually is the ambient temperature of the environment in which the engine-generator set is located. At this relatively low temperature in the operating range of the sensor, the relationship between the PWM signal value and temperature is relatively constant, as compared to the relationship for higher temperatures. Therefore, microcomputer is able to obtain the initial temperature with a direct conversion that does not require solving the exponential equation given above. The initial temperature is stored in the microcomputer memory.

Each time thereafter that the microcomputer 26 desires to obtain the present engine temperature, it reads the signal from the engine temperature sensor 30. The microcomputer measures the characteristic of that signal as described above. The resultant PWM signal value is then used as the variable t in the exponential equation to derive the present temperature of the engine. The resultant engine temperature valve is sent via the CAN communication bus 24 to the operator control panel 25, which displays that value on an engine temperature indicator.

Fitting an exponential function to the actual output data from the engine temperature sensor 30 greatly simplifies the conversion of the sensor's PWM signal value to the corresponding temperature. Because, only the initial engine temperature needs to known besides the present output of the temperature sensor the conversion is very straight forward.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A method for processing a PWM signal output from a sensor, the sensor having a signal converter and a sensing element, the sensor located on and sensing an operating parameter of an apparatus, said method comprising:

obtaining the PWM signal from the sensor, wherein the PWM signal has a characteristic that varies non-linearly and non-exponentially with changes in the operating parameter being sensed, and the PWM signal is pulse width modulated to indicate the operating parameter being sensed;

defining an exponential equation that specifies a relationship between the PWM signal from the sensor and the operating parameter of the apparatus, wherein the exponential equation contains a term for a value of the PWM signal and a term for an initial value of the operating parameter;

receiving the PWM signal from the sensor at a processor;

measuring the characteristic of the PWM signal, with the processor, to produce the value of the PWM signal; and using the value of the PWM signal to solve the exponential equation which produces a current value for the operating parameter of the apparatus.

2. The method as recited in claim 1 wherein the relationship between the signal from the sensor and the operating parameter is dependent upon an initial temperature of the apparatus, and wherein the exponential equation has a term corresponding to the initial temperature; and the method further comprises sensing the initial temperature of the apparatus to produce an initial temperature value and using that initial temperature value in subsequently solving the exponential equation.

3. The method as recited in claim 2 wherein the initial temperature occurs when the apparatus starts operating.

4. The method as recited in claim 1 wherein the relationship between the signal from the sensor and the operating parameter being sensed is dependent upon a steady state operating temperature of the apparatus, and wherein the exponential equation contains a term corresponding to the steady state operating temperature.

5. The method as recited in claim 1 wherein the operating parameter is temperature, and the exponential equation is given by:

$$T = T_\infty + \frac{T_i - T_\infty}{e^{kt}}$$

where T is the value for the operating parameter, $T_\infty$ is a steady state operating temperature of the apparatus, T, is an initial temperature of the apparatus, k is an exponential constant, and t is the sensor value.

6. The method as recited in claim 5 wherein the exponential constant k is defined based on at least one operating characteristic of the sensor.

7. A method for processing a PWM signal from a temperature sensor on an engine, wherein the PWM signal has a characteristic that varies non-linearly and non-exponentially with engine temperature changes, said method comprising:
    defining an exponential equation that specifies a relationship between the PWM signal from the temperature sensor and the engine temperature, wherein the exponential equation contains a term for a value of the PWM signal and a term for the initial value of the operating parameter;
    receiving the PWM signal from the temperature sensor at a processor, wherein the signal is pulse width modulated to indicate the engine temperature;
    measuring the characteristic of the PWM signal, with the processor, to produce the value of the PWM signal; and
    using the value of the PWM signal to solve the exponential equation which produces a current value for the engine temperature.

8. The method as recited in claim 7 wherein the relationship between the signal from the temperature sensor and the engine temperature is dependent upon an initial temperature when the engine starts operating, and wherein the exponential equation contains a term corresponding to the initial temperature.

9. The method as recited in claim 7 wherein the relationship between the signal from the sensor and temperature being sensed is dependent upon a steady state operating temperature of the engine, and wherein the exponential equation contains a term corresponding to the steady state operating temperature.

10. The method as recited in claim 7 wherein the exponential equation is given by:

$$T = T_\infty + \frac{T_i - T_\infty}{e^{kt}}$$

where T is the value for the engine temperature, $T\infty$ is a steady state operating temperature of the engine, T, is an initial temperature of the engine, k is an exponential constant, and t is the sensor value.

11. The method as recited in claim 10 wherein the exponential constant k is defined based on the relationship between the signal from the temperature sensor and the engine temperature.

12. A method for processing a pulse width modulated signal from a temperature sensor on an engine, wherein a portion of the signal has a duration that varies non-linearly and non-exponentially with engine temperature changes, said method comprising:
    defining an exponential equation that specifies a relationship between variation of the signal from the temperature sensor and the engine temperature, wherein the exponential equation is given by:

$$T = T_\infty + \frac{T_i - T_\infty}{e^{kt}}$$

where T is a sensor value for the engine temperature, $T \infty$ is a steady state operating temperature of the engine, $T_t$ is an initial temperature of the engine, k is an exponential constant, and t is the sensor value;
    receiving the signal from the temperature sensor;
    measuring a duration of the portion of the signal to produce the sensor value; and
    using the sensor value to solve the exponential equation which produces a value for the engine temperature.

13. The method as recited in claim 12 wherein the exponential constant k is defined based on the relationship between the signal from the temperature sensor and the engine temperature.

* * * * *